United States Patent
Marder

(10) Patent No.: US 10,657,418 B2
(45) Date of Patent: May 19, 2020

(54) OBJECT DETECTION ON LOCAL DEVICES USING REMOTELY GENERATED MACHINE LEARNING MODELS

(71) Applicant: International Business Machines Corporation, Armonk, NY (US)

(72) Inventor: Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 15/854,803

(22) Filed: Dec. 27, 2017

(65) Prior Publication Data
US 2019/0197355 A1 Jun. 27, 2019

(51) Int. Cl.
*G06K 9/00* (2006.01)
*G06N 20/00* (2019.01)
*G06K 9/62* (2006.01)
*G06K 9/78* (2006.01)
*G06K 9/18* (2006.01)

(52) U.S. Cl.
CPC ....... *G06K 9/6256* (2013.01); *G06K 9/00624* (2013.01); *G06K 9/00771* (2013.01); *G06K 9/18* (2013.01); *G06K 9/6267* (2013.01); *G06K 9/78* (2013.01); *G06N 20/00* (2019.01); *G06K 2209/01* (2013.01)

(58) Field of Classification Search
None
See application file for complete search history.

(56) References Cited

U.S. PATENT DOCUMENTS

| | | | |
|---|---|---|---|
| 9,239,989 B2 | 1/2016 | Bouqata et al. | |
| 9,563,854 B2 | 2/2017 | Cruz Mota et al. | |
| 10,282,852 B1* | 5/2019 | Buibas | G06K 9/00771 |
| 2015/0154555 A1 | 6/2015 | Skaaksrud | |
| 2015/0262116 A1* | 9/2015 | Katircioglu | G06Q 10/087 705/28 |
| 2017/0006141 A1 | 1/2017 | Bhadra | |
| 2019/0149725 A1* | 5/2019 | Adato | H04N 1/00 348/158 |

OTHER PUBLICATIONS

Harris et al., "Smart LaBLEs: Proximity, Autoconfiguration, and a Constant Supply of GatoradeTM", 2016 IEEE/ACM Symposium on Edge Computing, 2016, pp. 142-154.

(Continued)

*Primary Examiner* — Idowu O Osifade
(74) *Attorney, Agent, or Firm* — Gregory Kirsch

(57) ABSTRACT

Embodiments of the present invention may provide automated techniques for quickly and easily installing a different model for image recognition on each of numerous devices without doing manual configuration of each and every device. For example, in an embodiment, a computer-implemented method for configuring devices may comprise capturing data at a device, transmitting the captured data to a remote system, receiving configuration data for the device, wherein the configuration data has been generated by processing the captured data at the remote system using a plurality of different machine learning techniques and generating the configuration data based on at least one of the plurality of different machine learning techniques, and configuring the device using the received configuration data.

18 Claims, 8 Drawing Sheets

(56) References Cited

OTHER PUBLICATIONS

Krishnan et al., "Fog Computing—Network Based Cloud Computing", 2015 2nd International Conference on Electronics and Communication Systems (ICECS), 2015, pp. 250-251.

Paramanathan et al., "Sharing the Pi: Testbed Description and Performance Evaluation of Network Coding on the Raspberry Pi", 2014 IEEE 79th Vehicular Technology Conference (VTC Spring), 2014.

\* cited by examiner

OBJECT DETECTION ON LOCAL DEVICES USING REMOTELY GENERATED MACHINE LEARNING MODELS

BACKGROUND

The present invention relates to automated techniques for setting up machine learning devices to be used for image recognition.

Image recognition has a number of potential applications. For example, image recognition may be used for tracking product stocking on store and warehouse shelves, for surveillance of indoor or outdoor areas, and for detection of particular people, animals, cars, trucks, etc. Where large areas are to be monitored, relatively large numbers of monitoring devices may be installed. For example, a supermarket or other store, may install hundreds or thousands of small devices, such as single board computing devices, to monitor its shelves. Typically, single board computing devices have limited memory resources. Thus, is not feasible to load a generic machine learning model that would cover a whole store, or even a department, on every device. However, such devices have sufficient resources to store a model that covers only the subsection of products that the individual device is set to monitor.

Some conventional monitoring systems may use a limited generic model installed on every device. However, given the limited memory on the devices, this generic model must be small. Such a small model cannot deliver the adequate detection performance—rates and accuracy. Some conventional monitoring systems may use the monitoring device merely as an interface to cloud computing resources. The image recognition itself may then be performed in the cloud. However, in these systems, the computational resources on the devices themselves are not utilized. This results in additional costs for cloud computing and unnecessary network traffic. As each such device includes computational resources and is already purchased, there is a strong incentive to process captured shelf images on the devices rather on the cloud. However, manual configuration of a different model on each of hundreds or thousands of computing devices is very time-consuming and costly.

Accordingly, a need arises for techniques to quickly and easily install a different image recognition model on each of numerous devices without doing manual configuration of each and every device.

SUMMARY

Embodiments of the present invention may provide automated techniques for quickly and easily installing a different model for image recognition on each of numerous devices without doing manual configuration of each and every device.

For example, in an embodiment of the present invention, a computer-implemented method for configuring devices may comprise capturing data at a device, transmitting the captured data to a remote system, receiving configuration data for the device, wherein the configuration data has been generated by processing the captured data at the remote system using a plurality of different machine learning techniques and generating the configuration data based on at least one of the plurality of different machine learning techniques, and configuring the device using the received configuration data.

For example, in embodiments, the device may comprise a camera and a computing device, the captured data may include at least one image or video captured by the camera, and the configuration data may include a machine learning model for detecting an object in the image or video. The method may further comprise repeating the capturing and transmitting and wherein the received configuration data was generated based on statistics related to detection of objects by each of the plurality of different machine learning techniques. The received configuration data may further be generated based on at least one identified schema of object locations or identities that was identified based on the generated statistics related to detection of objects by each of the plurality of different machine learning techniques and by generating a data set including at least one of: data relating to objects detected up to a time at which the data set was generated and data relating to the objects included in the identified schema. The objects to be detected may include at least one of: products on store shelves, components to be assembled, vehicles or vessels to be tracked, humans or animals to be recognized or tracked. The received configuration data may include information relating to at least some of a plurality of objects in an area generated by determining, from an image of the area including the plurality of objects, an indicator of an object and any gaps between objects, obtaining information relating to an object associated with an indicator of an object, determining if a gap is present in relation to the associated object, determining a number of instances of an object in the area, and generating information relating to at least some of the plurality of objects in the area based on the obtained information relating to the object associated with the indicator of the object, the presence of gaps between objects, and the number of instances of the object in the area.

For example, in an embodiment, a computer program product for configuring devices, may comprise a non-transitory computer readable storage having program instructions embodied therewith, the program instructions executable by a computer, to cause the computer to perform a method comprising capturing data at a device, transmitting the captured data to a remote system, receiving configuration data for the device, wherein the configuration data has been generated by processing the captured data at the remote system using a plurality of different machine learning techniques and generating the configuration data based on at least one of the plurality of different machine learning techniques, and configuring the device using the received configuration data.

For example, in an embodiment, a system for detecting objects may comprise a camera and a computing device, the computing device comprising a processor, memory accessible by the processor, and computer program instructions stored in the memory and executable by the processor to perform capturing data at the device, transmitting the captured data to a remote system, receiving configuration data for the device, wherein the configuration data has been generated by processing the captured data at the remote system using a plurality of different machine learning techniques and generating the configuration data based on at least one of the plurality of different machine learning techniques, and configuring the device using the received configuration data.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present invention may provide automated techniques for installing a different image recognition model on each of numerous devices without doing manual configuration of each and every device.

Figure 1:
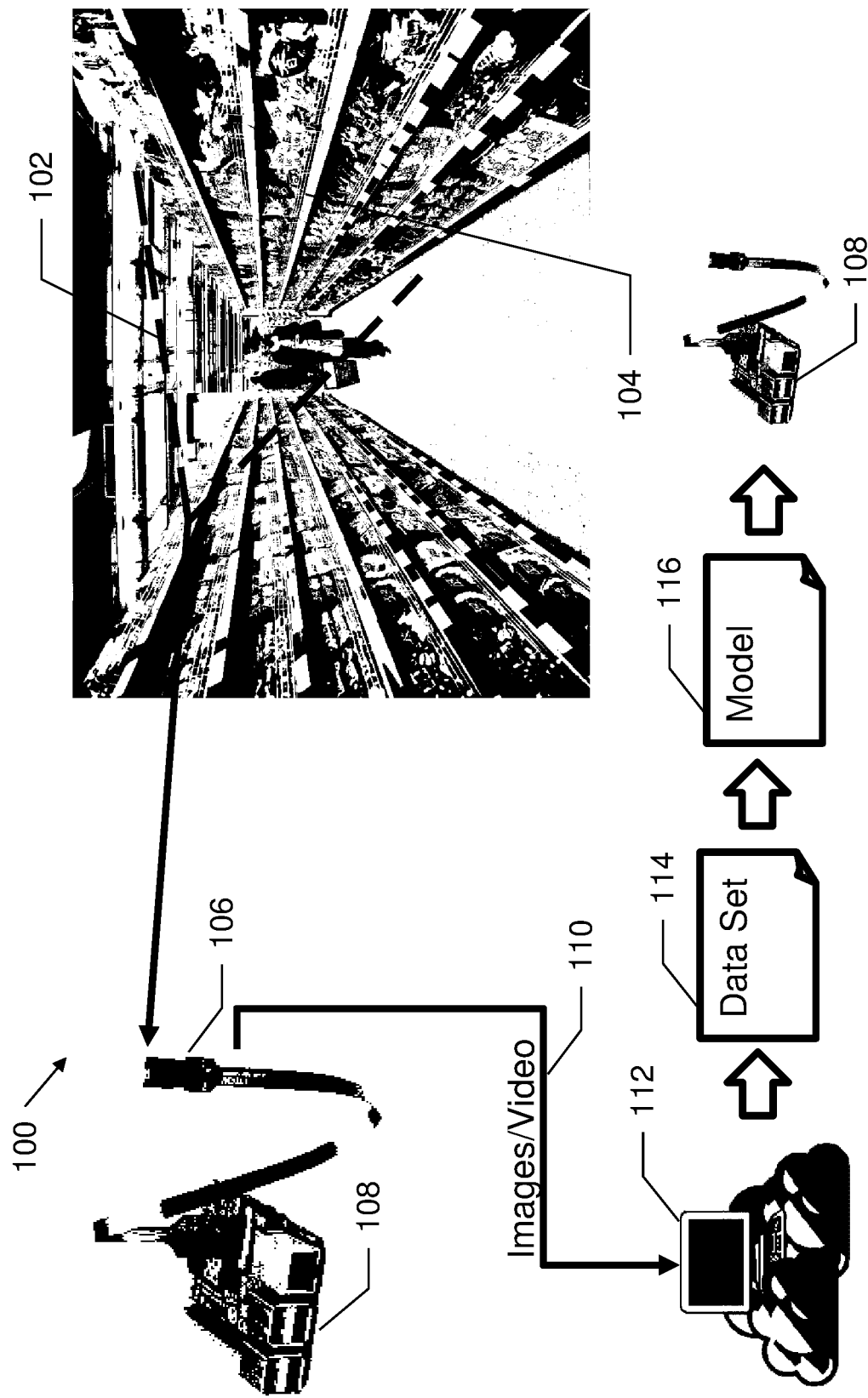
FIG. 1 is an exemplary diagram of a typical image recognition/object detection environment.

An example of a typical image recognition/object detection environment 100 is shown in FIG. 1. Environment 100 may include a monitored area 102, which may include objects to be detected 104, camera 106, and computing device 108. Objects to be detected 104 may include any objects or types of objects that may be detected based on processing and recognition of one or more images of the objects. Examples may include, but are not limited to, products on store shelves, components to be assembled, vehicles or vessels to be tracked, humans or animals to be recognized or tracked, etc. Camera 106 may be arranged so as to be directed towards monitored area 102 and to include objects to be detected 102 within its field of view. Camera 106 may be connected to (or included in) computing device 108 and may transmit its output image data to computing device 108 for processing. Computing device 108 may be, for example, a single board computer system, such as a RASPBERRY PI™, or other publicly available or proprietary computing device capable of receiving and processing image data from camera 106. Computing device 108 typically includes a processor, memory, and wireless and/or wired networking capabilities.

Figure 2:
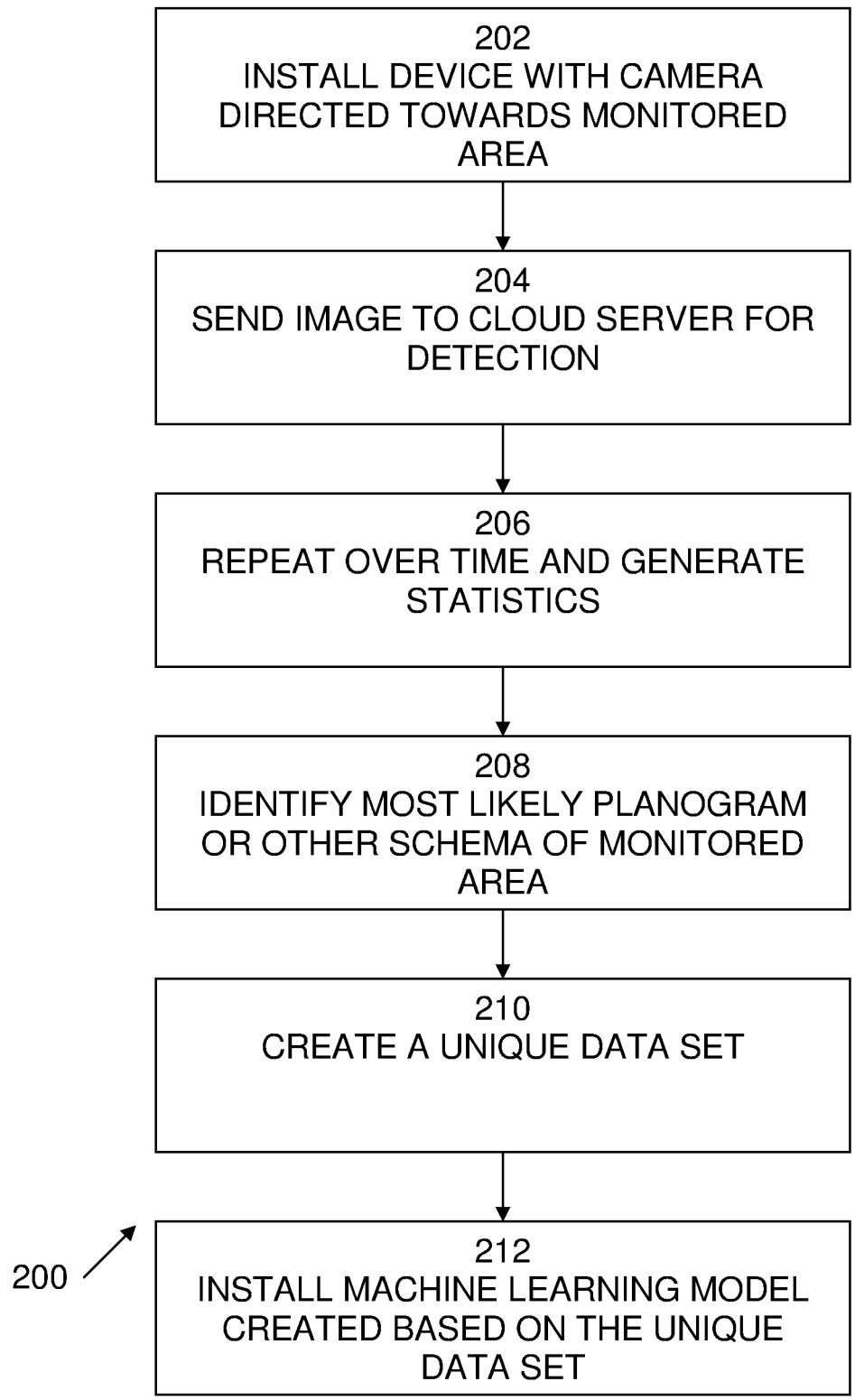
FIG. 2 is an exemplary flow diagram of a process according to an embodiment of the present invention.

An exemplary flow diagram of a process 200 of configuring monitoring computing devices according to an embodiment of the present invention is shown in FIG. 2. It is best viewed in conjunction with FIG. 1. Process 200 begins with 202, in which one or more computing devices 108 with connected or included cameras 106 are installed with the field of view of camera 106 directed towards monitored area 102. At 204, camera 106 may capture one or more images 110 of monitored area 102 and transmit the images 110 to computing device 108. Computing device 108 may transmit the captured images 110 to a remote server 112, such as a cloud server, for image recognition processing so as to perform object detection. Typically, the captured images are transmitted using the wireless and/or wired networking capabilities of computing device 108. As this initial detection is performed remotely, and is performed for initial configuration, this detection is not time critical. Accordingly, the initial detection may be performed using exhaustive methods, which may be time and resource intensive. For example, the initial detection may be performed using a plurality of different classification engines or techniques, and using a plurality of different classification data sets.

At 206, optional processing may be performed including repeated capturing and processing images according to 204. As the objects present in monitored area 102 change over time, the repeated image capture and processing provides additional data for the exhaustive detection processing. Further, as the image capture and processing are repeated, statistics may be generated indicating which objects were detected, as well as changes in object detection over time. At 208, additional optional processing may be performed including identifying a likely schema of object locations and/or identities in the monitored area using the generated statistics. For example, in where the monitored area is one or more store shelves, the schema of object locations and/or identities may include a store planogram or other object placement diagram. Typically, a planogram may include a representation of physical placement of objects on shelves, along with identifiers of the objects, such as stock keeping unit (SKUs) numbers, Universal Product Code (UPC) numbers, barcodes, or other standard or proprietary identifiers of the objects. Such information may be stored in a database and may be known as an object catalogue or a product database.

At 210, a unique data set 114 covering the monitored area may be generated for each computing device 108. This unique data set 114 may be based on the objects detected at 204, as well as the statistics generated at 206, and/or the schema or planogram identified at 208. For example, the unique data set 114 may include data relating to the objects detected up to the time at which the data set was generated, data relating to the objects included in the schema or planogram identified at 208, or the union of the two sets of object data. In embodiments, the unique data set 114 may include only such data, thus, a machine learning model that may be created based on the unique data set may be of relatively small size; sufficiently small to easily fit in the available memory of computing device 108.

At 212, a different initial machine learning model 116 may be created for each computing device 108 based on the unique data set generated at 210. Examples of types of machine learning models 116 may include decision tree models, association rule models, artificial neural network models, deep learning models, inductive logic programming models, support vector machine models, clustering models, Bayesian network models, reinforcement models, representation models, similarity and metric models, sparse dictionary models, genetic algorithm models, rule-based machine models, etc. Each initial machine learning model 116 may then be automatically installed on its corresponding computing device 108, such as using the wireless and/or wired networking capabilities of each computing device 108.

Figure 3:
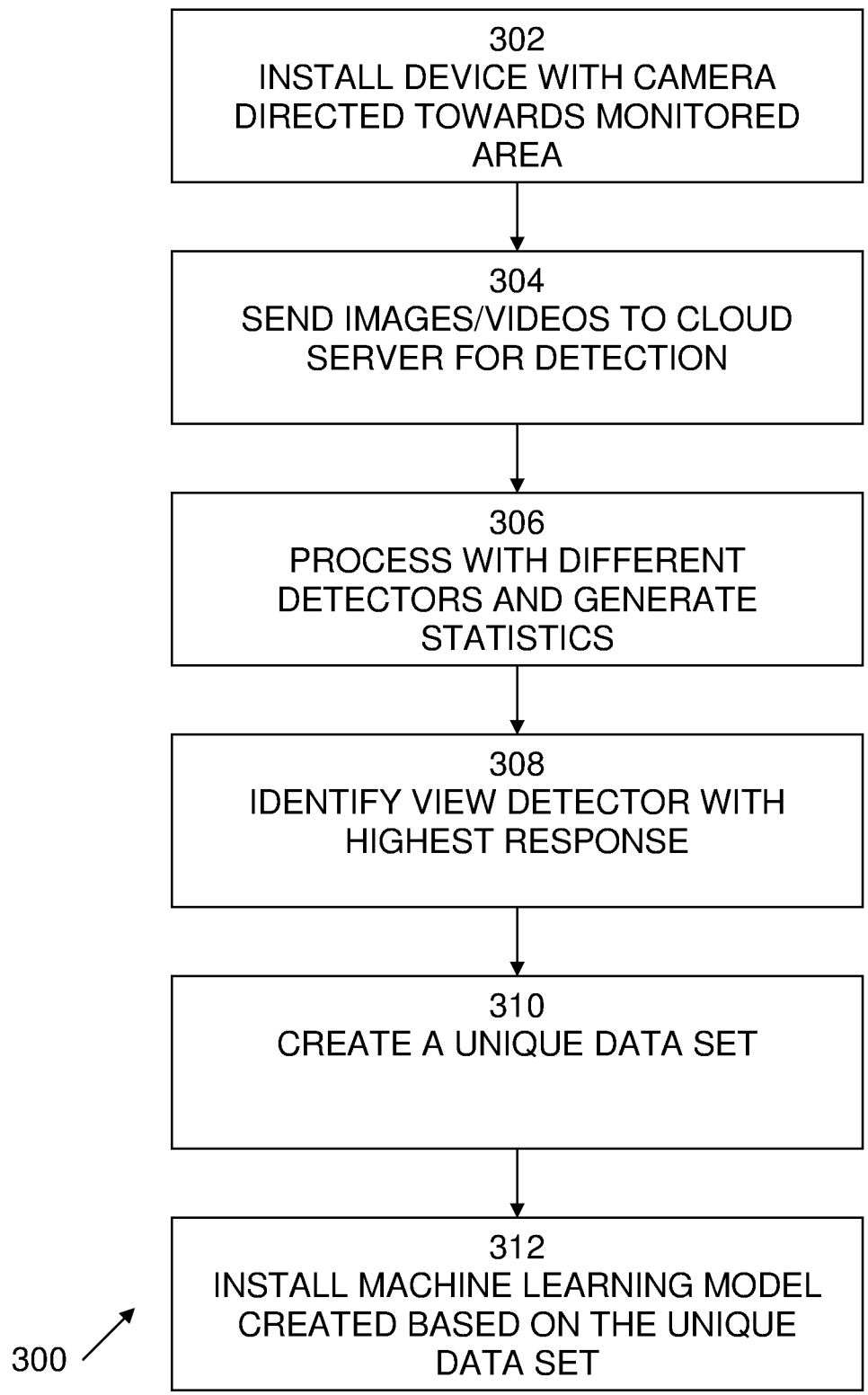
FIG. 3 is an exemplary flow diagram of a process according to an embodiment of the present invention.

In embodiments, the present techniques may be used, for example, for configuration of surveillance systems for monitoring object such as people, animals, vehicle, vessels, etc. Such techniques may be used, for example, in casinos, airports, parking lots, stadiums, etc. An exemplary flow diagram of a process 300 of configuring monitoring computing devices according to an embodiment of the present invention is shown in FIG. 3. It is best viewed in conjunction with FIG. 1. Process 300 begins with 302, in which one or more computing devices 108 with connected or included cameras 106 are installed with the field of view of camera 106 directed towards monitored area 102, which is being monitored for detection of the object present, such as people, animals, vehicle, vessels, etc. At 304, camera 106 may capture one or more images and/or video 110 of monitored area 102 and transmit the images and/or video 110 to computing device 108. Computing device 108 may transmit the captured images and/or video 110 to a remote server 112, such as a cloud server, for image recognition processing so as to perform object detection. Typically, the captured images and/or video 110 are transmitted using the wireless and/or wired networking capabilities of computing device 108.

At 306, the captured images and/or video 110 may be processed using a plurality of detection processing techniques. For example, if people are to be detected, a plurality of viewpoint dependent visual person detection processing techniques may be utilized. As objects present in the environment move through the environment, the objects may be encountered or viewed from various viewpoints. These changing viewpoints cause variability in the images of the objects that are captured. Changes in orientation may affect processing of visual information. For example, as the viewpoint changes, so does the shape of the image that is captured. Viewpoint image processing techniques may handle images of objects or persons presenting different viewpoints differently. Accordingly, the present techniques may process captured images and/or video 110 using a plurality of viewpoint dependent visual person detection processing techniques.

For example, if objects are to be detected in a variety of visual conditions, a plurality of detection techniques directed to different visual, lighting, weather, and other conditions may be utilized. As visual conditions in the environment change, such changes may cause variability in the images of the objects that are captured, such as brightness, contrast, color balance, effective resolution, etc. Accordingly, the present techniques may process captured images and/or video 110 using a plurality of detection techniques directed to different visual, lighting, weather, and other conditions.

Statistics relating to the performance of the various different techniques may be generated based on the results of the processing of the captured images and/or video 110. Such statistics may include the accuracy of the detection, the speed of the detection, the error rates for such detection, including false positive rate and false negative rate, etc.

At 308, the detection processing techniques having the highest performance may be identified based on the generated statistics. For example, a technique having the highest accuracy and/or the lowest false positive rate or false negative rate may be selected as the highest performance technique. At 310, a unique data set 114 covering the monitored area may be generated. This unique data set 114 may include the data necessary to implement the detection processing technique identified at 308. At 312, a different detection model 116 may be created for each computing device 108 based on the unique data set generated at 310. Each detection model 116 may then be automatically installed on its corresponding computing device 108, such as using the wireless and/or wired networking capabilities of each computing device 108. Once the model is installed on a computing device 108, that computing device may only reports when its onboard detection processing detects an event, such as detection of a person, or a particular person.

In embodiments, the present techniques may provide the capability for monitoring objects or products based on predetermined monitored areas. However, in embodiments, product detection using an object or product database or catalogue created on the fly. For example, the processes shown above may utilize an object or product database—a compilation of information about the objects or products present in a monitored area. There are a number of ways such an object or product database may be compiled. For example, drones may be used to fly automated or predetermined routes to automatically capture many images of the monitored area, such as shelves. Such drones may get close enough to the objects or shelves to see the finest details, or such resolution may be achieved too optically at larger distances. An object or product database may be generated by employing gap detection and barcode/text detection and decoding functionality, without preexisting knowledge of the objects or products present. In embodiments, gap detection may avoid using empty shelf space as an example for an expected object or product. In embodiments, object or product instances may be detected by employing a generic object or product detector, for example, a visual detector trained for detecting cans, bottles, bags, boxes, etc., without regards to specific product lines. For example, the You Only Look Once (YOLO) object detection technique, may be utilized as a generic object or product detector.

As the process proceeds over time, a significant statistical correlation between the barcodes read and the product instances seen in proximity to the barcodes may be developed. Such a statistical correlation may be developed not just based on a single device, but based on multiple devices at the same location, multiple devices at the different locations, etc. For example, the appearance of a particular object or product may be learned from many stores, warehouses etc., rather than just a single device. This is especially true when gathering images throughout a location. These correlations may be used to create an up to date object or product database on the fly.

Figure 6:
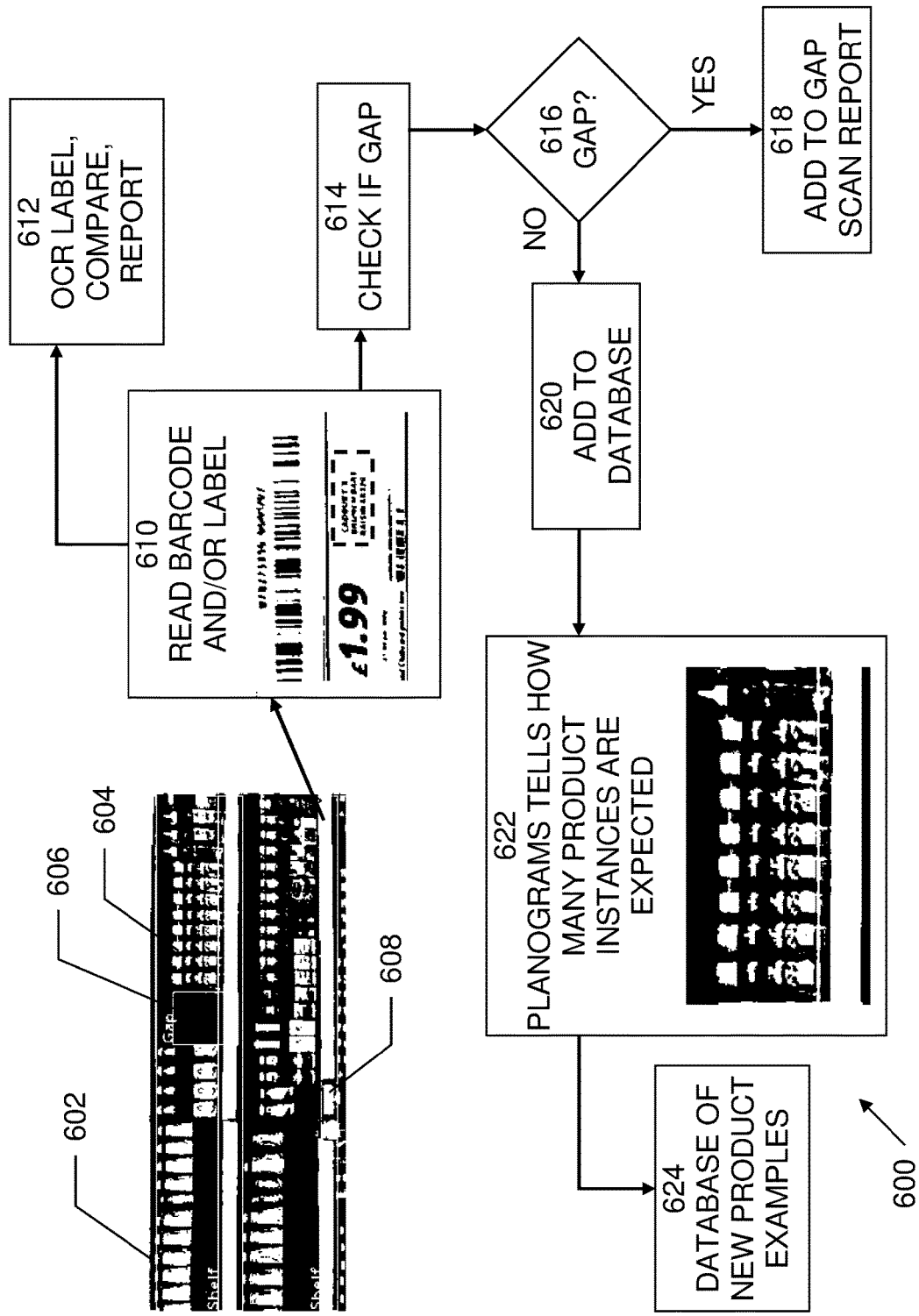
FIG. 6 is an exemplary flow diagram of a process according to an embodiment of the present invention.

Turning now to FIG. 6, an example of a process 600 of object or product database generation is shown. An image 602 monitored area or portion of a monitored area may include a number of objects or products 604, which may be separated by gaps 606, and which may be in proximity to barcodes and/or object or product labels or descriptions 608. At 610, an image 602, or portion thereof, of an area may be processed to read a barcode and/or a label associated with an object 604 shown in image 602. For example, the barcode may reference a particular stock-keeping unit (SKU) or the label may include a price and name or description of a product. In an embodiment, at 612, the barcode may be decoded and/or the label may be recognized using optical character recognition (OCR). The decoded and/or recognized information may be compared with information in an enterprise resource planning (ERP) database to determine whether the corresponding object or product in included in the database. The results of the comparison may be reported so that appropriate action may be taken based on the results.

In embodiments, after 610, at 614, it may be determined whether or not there is a gap in the vicinity of each barcode, up to and until the position of the next barcode. The location of such gaps relative to the barcodes may vary depending upon the typical arrangement of objects on the shelves. At 616, if it determined that there is a gap present, then the process continues with 618, in which the presence of a gap at that location may be added to a gap scan report, which may be used to indicate, for example, low stock of a particular object or product on a shelf. At 616, if it is determined that there is not a gap present, then the process continues with 620, in which the region above the price tag and/or label may be added to a database of areas to be monitored and to train a machine learning model, such as a deep neural network (DNN) model.

At 622, one or more planograms of the area being monitored, such as of shelves, may be consulted to determine how many instances of the indicated object or product are to be expected to be present in the location, also considering the detected gap and/or the output of a generic object, product, or container detector. For example, the width of any gap that is present may be determined relative to the region expected to be occupied by a particular object or product. For example, if 100% of the expected region is covered by a gap, no objects or products are present and no examples are generated. If 50% of the expected region is covered by a detected gap, then the remaining area may be used to create examples corresponding to 50% of the number of expected object or product instances. For example, three single object or product instances may be present in an area where six object or product instances were expected, and a gap may be detected of half the width of the region. Alternatively, examples of bundles of objects or products may be generated. For example, three object or product bundle example may be generated if a 50% gap was detected at an area were six object or product instances were expected according to the planogram. At 624, the object or product indicated by the barcode and/or label may be added to the object or product database that is being compiled. As data is compiled over time and across locations, statistically mistakes entering the object or product database may be relatively few or may be corrected or reduced.

Figure 7:
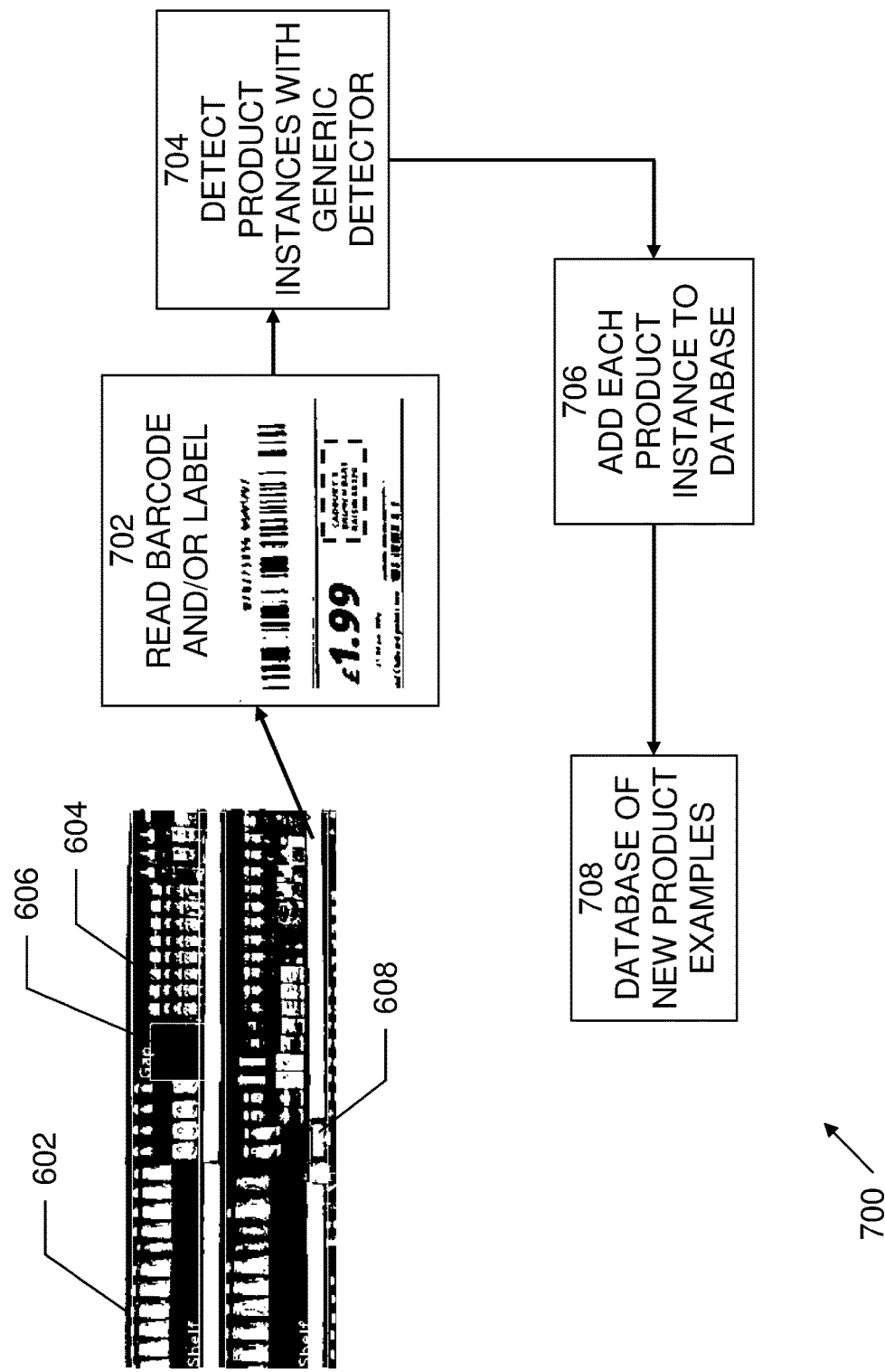
FIG. 7 is an exemplary flow diagram of a process according to an embodiment of the present invention.

An example of a process 700 of object or product database generation is shown in FIG. 7. An image 602 monitored area or portion of a monitored area may include a number of objects or products 604, which may be separated by gaps 606, and which may be in proximity to barcodes and/or object or product labels or descriptions 608. At 702, an image 602, or portion thereof, of an area may be processed to read a barcode and/or a label associated with an object 604 shown in image 602. At 704, object or product instances may be detected using a generic product detector. At 706, each instance of a different object or product may be added to the object or product database 708 that is being compiled. As data is compiled over time and across locations, statistically mistakes entering the object or product database may be relatively few or may be corrected or reduced.

Figure 8:
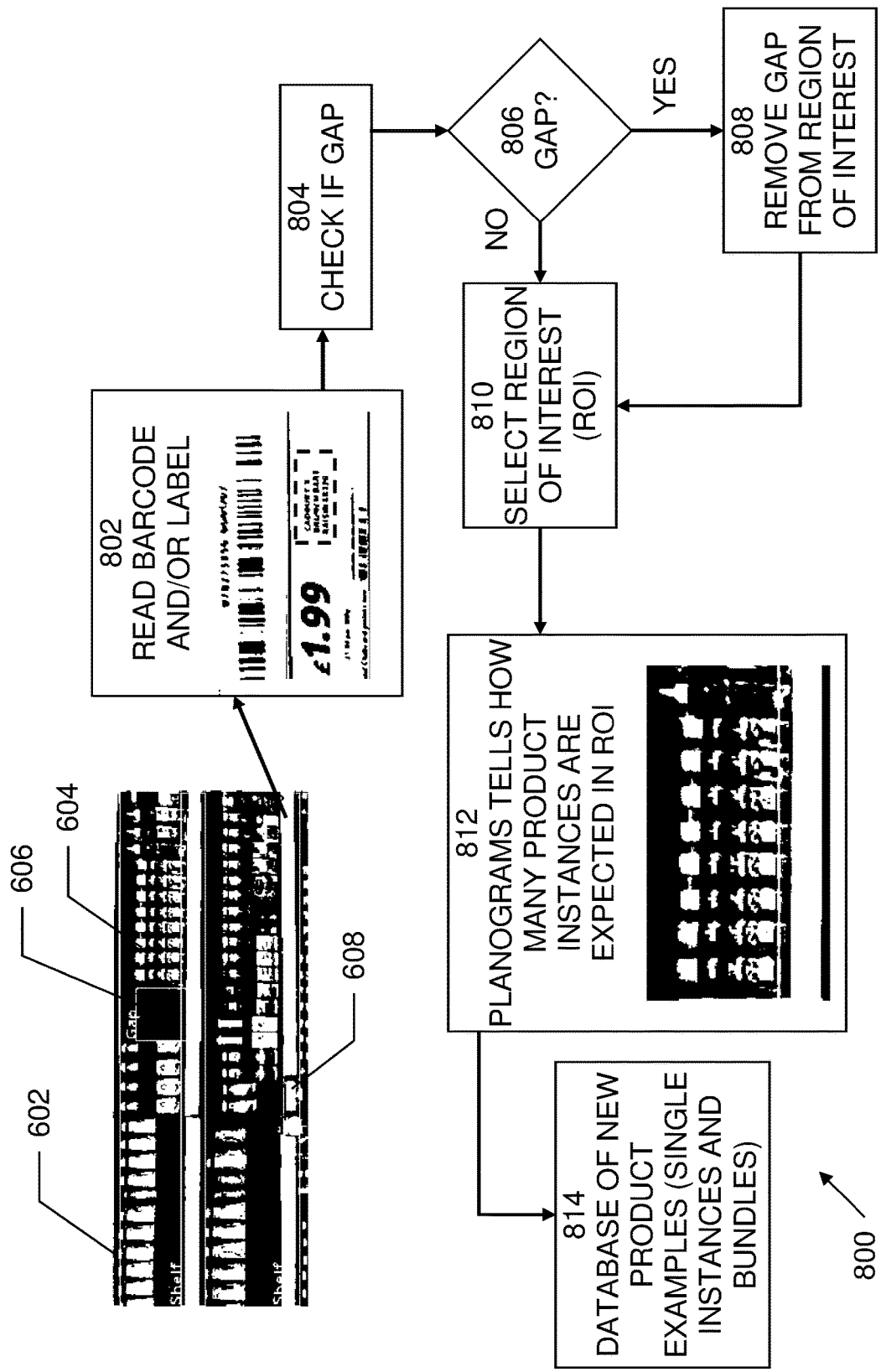
FIG. 8 is an exemplary flow diagram of a process according to an embodiment of the present invention.

An example of a process 800 of object or product database generation is shown in FIG. 8. An image 602 monitored area or portion of a monitored area may include a number of objects or products 604, which may be separated by gaps 606, and which may be in proximity to barcodes and/or object or product labels or descriptions 608. At 802, an image 602, or portion thereof, of an area may be processed to read a barcode and/or a label associated with an object 604 shown in image 602. At 804, it may be determined whether or not there is a gap in the vicinity of each barcode, up to and until the position of the next barcode. The location of such gaps relative to the barcodes may vary depending upon the typical arrangement of objects on the shelves. At 806, if it determined that there is a gap present, then the process continues with 808, in which the gap may be removed from the Region of Interest (ROI). At 808, and at 806, if it is determined that there is not a gap present, then the process continues with 810, in which the ROI (minus any gap) may be selected. At 812, one or more planograms of the area being monitored, such as of shelves, may be consulted to determine how many instances of the indicated object or product are to be expected to be present in the location, also considering the detected gap and/or the output of a generic object, product, or container detector. For example, the width of any gap that is present may be determined relative to the region expected to be occupied by a particular object or product. For example, if 100% of the expected region is covered by a gap, no objects or products are present and no examples are generated. If 50% of the expected region is covered by a detected gap, then the remaining area may be used to create examples corresponding to 50% of the number of expected object or product instances. For example, three single object or product instances may be present in an area where six object or product instances were expected, and a gap may be detected of half the width of the region. Alternatively, examples of bundles of objects or products may be generated. For example, three object or product bundle example may be generated if a 50% gap was detected at an area were six object or product instances were expected according to the planogram. At 814, the object or product, or object or product bundle indicated by the barcode and/or label may be added to the object or product database that is being compiled. As data is compiled over time and across locations, statistically mistakes entering the object or product database may be relatively few or may be corrected or reduced.

Figure 4:
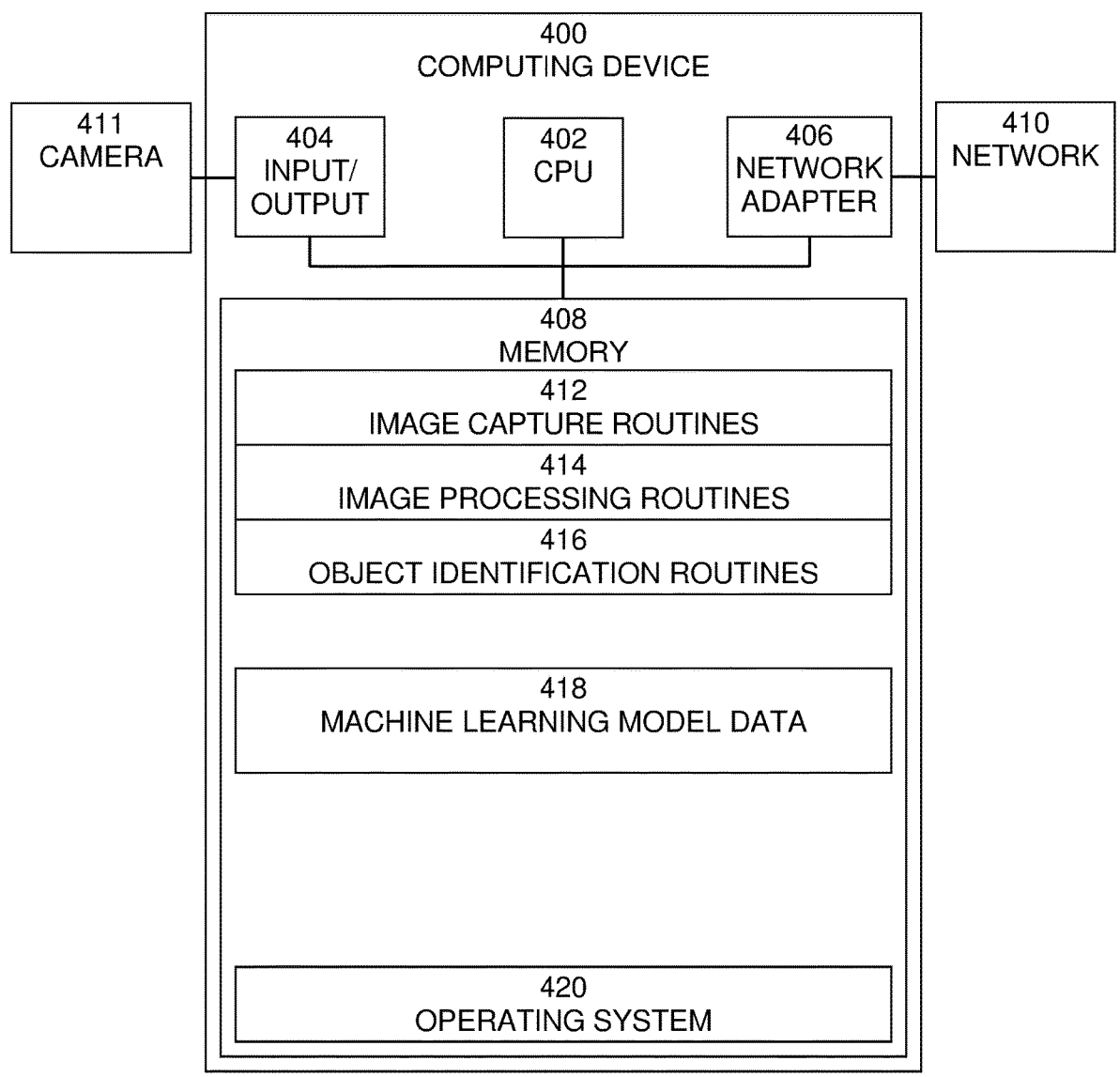
FIG. 4 is an exemplary block diagram of a computing device in which processes involved in the embodiments described herein may be implemented.

An exemplary block diagram of a computing device 400, also shown as 108 in FIG. 1, in which processes involved in the embodiments described herein may be implemented, is shown in FIG. 4. Computing device 400 is typically a single board computer system, such as a RASPBERRY PI™, but may be an embedded processor, system on a chip, personal computer, workstation, server system, and minicomputer or mainframe computer. Computing device 400 may include one or more processors (CPUs or GPUs) 402, input/output circuitry 404, network adapter 406, and memory 408. CPU 402 executes program instructions in order to carry out the functions of the present invention. Typically, CPU 402 is one or more microprocessors, such as an INTEL PENTIUM® processor. FIG. 4 illustrates an embodiment in which computing device 400 is implemented as a single processor computer system, in which processor 402 accesses system resources, such as memory 408, input/output circuitry 404, and network adapter 406. However, the present invention also contemplates embodiments in which computing device 400 is implemented as a multi-processor computer system.

Input/output circuitry 404 provides the capability to input data to, or output data from, computing device 400. For example, input/output circuitry may include input devices, such as camera 411, keyboards, mice, touchpads, trackballs, scanners, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computing device 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computing device 400 is programmed to perform. In the example shown in FIG. 4, memory 408 may include image capture routines 412, image processing routines 414, object identification routines 416, machine learning model data 418, and operating system 420. For example, image capture routines 412 may include routines to capture images of objects, such as products, persons, vehicles, vessels, etc. within the field of view of camera 411. Image processing routines 414 may include routines to process the captured images for transmission to a remote computer system, and/or for processing by object identification routines 416. Object identification routines 416 may include routines to process the captured images to detect and identify the objects that are present using machine learning model data 418. Machine learning model data 418 may include one or more machine learning models received from a remote computer system, which may provide the capability for object identification routines 416 to detect and identify the objects that are present in the captured images. Operating system 420 provides overall system functionality.

Figure 5:
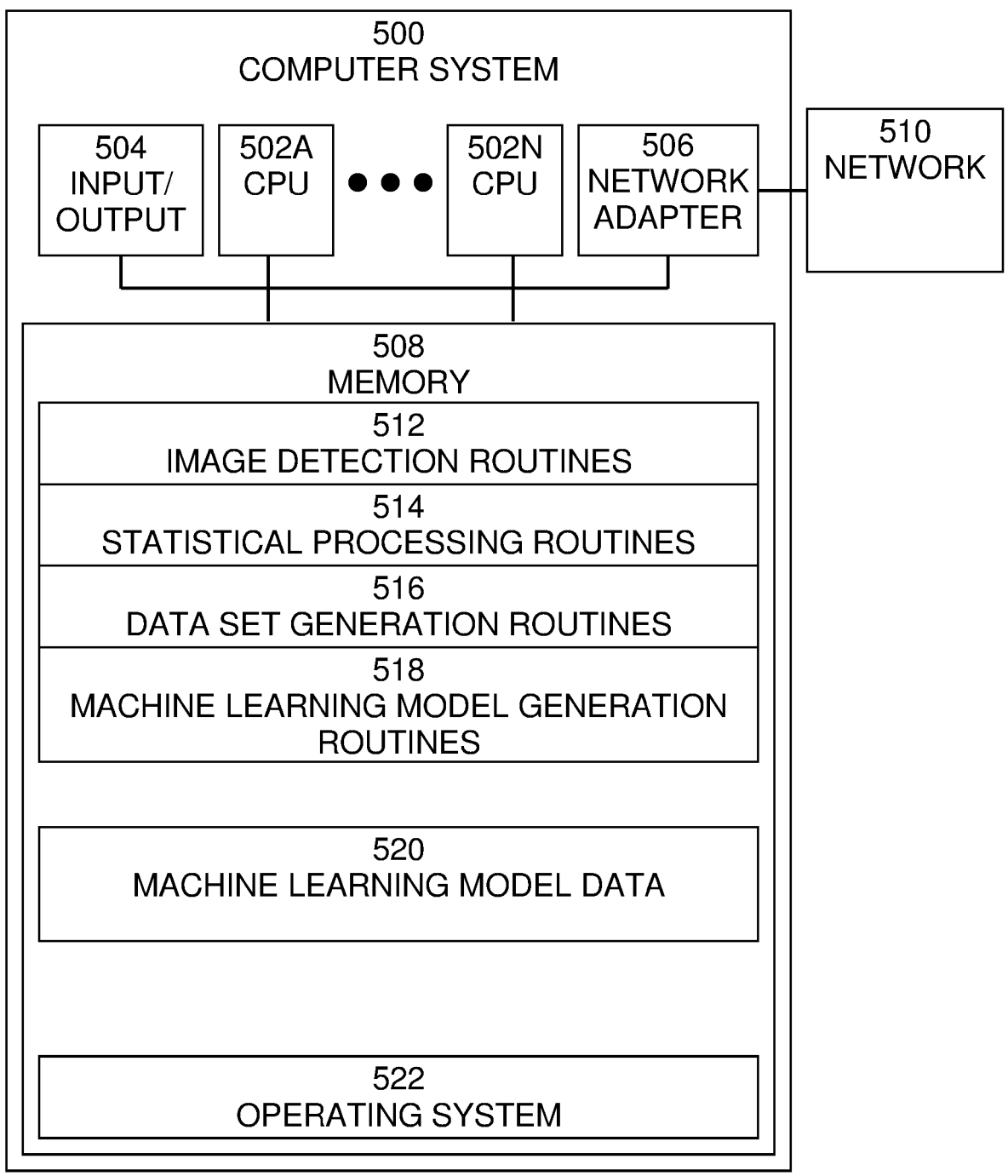
FIG. 5 is an exemplary block diagram of a computer system in which processes involved in the embodiments described herein may be implemented.

An exemplary block diagram of a computer system 500, also shown as 112 in FIG. 1, in which processes involved in the embodiments described herein may be implemented, is shown in FIG. 5. Computer system 500 is typically a programmed general-purpose computer system, such as an embedded processor, system on a chip, personal computer, workstation, server system, and minicomputer or mainframe computer. Computer system 500 may include one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 500 is programmed to perform. One of skill in the art would recognize that routines included in computer system 500, along with the memory contents related to those routines, may not typically be included on one system or device, but rather are typically distributed among a plurality of systems or devices, based on well-known engineering considerations. The present invention contemplates any and all such arrangements.

In the example shown in FIG. 5, memory 508 may include image detection routines 512, statistical processing routines 514, data set generation routines 516, machine learning model generation routines 518, machine learning model data 520, and operating system 522. For example, image detection routines 512 may include routines to perform initial detection of objects in images, and which may be performed using exhaustive methods, which may be time and resource intensive. For example, the initial detection may be performed using a plurality of different classification engines or techniques, and using a plurality of different classification data sets. Statistical processing routines 514 may include routines to generate statistics indicating which objects were detected, as well as changes in object detection over time, as well as identifying a likely schema of object locations in the monitored area using the generated statistics. Data set generation routines 516 may include routines to generate a unique data set covering the monitored area. Machine learning model generation routines 518 may include routines to generate a different initial machine learning model for each computing device based on each unique data set that was generated. Machine learning model data 520 may include data representing each generated machine learning model that is to be loaded into each computing device 108, 400. Operating system 522 provides overall system functionality.

As shown in FIGS. 4 and 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for configuring devices comprising:
monitoring an area with a device comprising a camera and a computing device;
capturing data at the device, wherein the captured data includes at least one image or video captured by the camera;
transmitting the captured data to a remote system;
receiving configuration data at the device, wherein the configuration data has been generated by processing the captured data at the remote system using a plurality of different machine learning techniques and generating the configuration data based on at least one of the plurality of different machine learning techniques, wherein the configuration data includes a machine learning model for detecting at least one object in the image or video; and
configuring the device using the received configuration data; and
detecting, at the device, at least one object using the machine learning model during monitoring of the area.

2. The method of claim 1, further comprising:
repeating the capturing and transmitting; and
wherein the received configuration data was generated based on statistics related to detection of objects by each of the plurality of different machine learning techniques.

3. The method of claim 2, wherein the received configuration data has further been generated based on at least one identified schema of object locations or identities that was identified based on the generated statistics related to detection of objects by each of the plurality of different machine learning techniques and by generating a data set including at least one of: data relating to objects detected up to a time at which the data set was generated and data relating to the objects included in the identified schema.

4. The method of claim 1, wherein the objects to be detected include at least one of: products on store shelves, components to be assembled, vehicles or vessels to be tracked, humans or animals to be recognized or tracked.

5. The method of claim 1, wherein the received configuration data includes information relating to at least some of a plurality of objects in an area generated by:
determining, from an image of the area including the plurality of objects, an indicator of an object and any gaps between objects;
obtaining information relating to an object associated with an indicator of an object;
determining if a gap is present in relation to the associated object;
determining a number of instances of an object in the area; and
generating information relating to at least some of the plurality of objects in the area based on the obtained information relating to the object associated with the indicator of the object, the presence of gaps between objects, and the number of instances of the object in the area.

6. A computer program product for configuring devices, the computer program product comprising a non-transitory computer readable storage having program instructions embodied therewith, the program instructions executable by a computer, to cause the computer to perform a method comprising:
monitoring an area with a device comprising a camera and a computing device;
capturing data at the device, wherein the captured data includes at least one image or video captured by the camera;
transmitting the captured data to a remote system;
receiving configuration data at the device, wherein the configuration data has been generated by processing the captured data at the remote system using a plurality of different machine learning techniques and generating the configuration data based on at least one of the plurality of different machine learning techniques, wherein the configuration data includes a machine learning model for detecting at least one object in the image or video; and
configuring the device using the received configuration data; and
detecting, at the device, at least one object using the machine learning model during monitoring of the area.

7. The computer program product of claim 6, further comprising:
repeating the capturing and transmitting; and
wherein the received configuration data was generated based on statistics related to detection of objects by each of the plurality of different machine learning techniques.

8. The computer program product of claim 7, wherein the received configuration data has further been generated based on at least one identified schema of object locations or identities that was identified based on the generated statistics related to detection of objects by each of the plurality of different machine learning techniques and by generating a data set including at least one of: data relating to objects detected up to a time at which the data set was generated and data relating to the objects included in the identified schema.

9. The computer program product of claim 6, wherein the objects to be detected include at least one of: products on store shelves, components to be assembled, vehicles or vessels to be tracked, humans or animals to be recognized or tracked.

10. The computer program product of claim 6, wherein the received configuration data includes information relating to at least some of a plurality of objects in an area generated by:
determining, from an image of the area including the plurality of objects, an indicator of an object and any gaps between objects;
obtaining information relating to an object associated with an indicator of an object;
determining if a gap is present in relation to the associated object;
determining a number of instances of an object in the area; and
generating information relating to at least some of the plurality of objects in the area based on the obtained information relating to the object associated with the indicator of the object, the presence of gaps between objects, and the number of instances of the object in the area.

11. A system for detecting objects, the system comprising a camera and a computing device, the computing device comprising a processor, memory accessible by the processor, and computer program instructions stored in the memory and executable by the processor to perform:

monitoring an area with the system;

capturing data at the system, wherein the captured data includes at least one image or video captured by the camera;

transmitting the captured data to a remote system;

receiving configuration data at the device, wherein the configuration data has been generated by processing the captured data at the remote system using a plurality of different machine learning techniques and generating the configuration data based on at least one of the plurality of different machine learning techniques, wherein the configuration data includes a machine learning model for detecting at least one object in the image or video; and configuring the device using the received configuration data; and detecting, at the device, at least one object using the machine learning model during monitoring of the area.

12. The system of claim 11, further comprising:
repeating the capturing and transmitting; and
wherein the received configuration data was generated based on statistics related to detection of objects by each of the plurality of different machine learning techniques.

13. The system of claim 12, wherein the received configuration data has further been generated based on at least one identified schema of object locations or identities that was identified based on the generated statistics related to detection of objects by each of the plurality of different machine learning techniques and by generating a data set including at least one of: data relating to objects detected up to a time at which the data set was generated and data relating to the objects included in the identified schema.

14. The system of claim 11, wherein the objects to be detected include at least one of: products on store shelves, components to be assembled, vehicles or vessels to be tracked, humans or animals to be recognized or tracked.

15. The system of claim 11, wherein the received configuration data includes information relating to at least some of a plurality of objects in an area generated by:

determining, from an image of the area including the plurality of objects, an indicator of an object and any gaps between objects;

obtaining information relating to an object associated with an indicator of an object;

determining if a gap is present in relation to the associated object;

determining a number of instances of an object in the area; and generating information relating to at least some of the plurality of objects in the area based on the obtained information relating to the object associated with the indicator of the object, the presence of gaps between objects, and the number of instances of the object in the area.

16. The method of claim 1, wherein the machine learning model comprises a unique dataset covering the monitored area.

17. The computer program product of claim 6, wherein the machine learning model comprises a unique dataset covering the monitored area.

18. The system of claim 11, wherein the machine learning model comprises a unique dataset covering the monitored area.

* * * * *